(12) United States Patent
Scheidl et al.

(10) Patent No.: US 7,878,077 B2
(45) Date of Patent: Feb. 1, 2011

(54) DEVICE FOR MEASURING MECHANICAL QUANTITIES, METHOD FOR MEASURING MECHANICAL QUANTITIES AND USE OF A DEVICE FOR MEASURING MECHANICAL QUANTITIES

(75) Inventors: Andreas Scheidl, Vandans (AT); Josef Schmid, Hohenems (AT); Axel Burkhardt, Gurtis (AT); Klaus Schneider, Hergatz (DE)

(73) Assignee: Liebherr-Werk Nenzing GmbH, Nenzing (AT)

( * ) Notice: Subject to any disclaimer, the term of this patent is extended or adjusted under 35 U.S.C. 154(b) by 14 days.

(21) Appl. No.: 12/283,945

(22) Filed: Sep. 17, 2008

(65) Prior Publication Data

US 2009/0100941 A1      Apr. 23, 2009

(30) Foreign Application Priority Data

Sep. 17, 2007     (DE) .................... 10 2007 044 225

(51) Int. Cl.
*G01L 5/04* (2006.01)
(52) U.S. Cl. .................... 73/862.42; 73/862.61
(58) Field of Classification Search .............. 73/862.42, 73/862.61–862.642, 856
See application file for complete search history.

(56) References Cited

U.S. PATENT DOCUMENTS

| | | | | |
|---|---|---|---|---|
| 3,577,779 A * | 5/1971 | Laimins | ................. | 73/862.633 |
| 3,712,123 A * | 1/1973 | Laimins | ................. | 73/862.632 |
| 4,143,727 A * | 3/1979 | Jacobson | ................. | 177/211 |
| 4,488,611 A * | 12/1984 | Jacobson | ................. | 177/211 |
| 4,542,800 A * | 9/1985 | Knothe et al. | ................. | 177/211 |
| 4,821,583 A * | 4/1989 | Richards | ................. | 73/862.474 |
| 4,993,506 A * | 2/1991 | Angel | ................. | 177/211 |
| 5,095,764 A * | 3/1992 | Saner | ................. | 73/862.59 |
| 5,228,527 A * | 7/1993 | Kroll et al. | ................. | 177/211 |
| 5,510,581 A * | 4/1996 | Angel | ................. | 177/211 |
| 5,684,254 A * | 11/1997 | Nakazaki et al. | ................. | 73/774 |
| 6,441,324 B1 * | 8/2002 | Stimpson | ................. | 177/137 |
| 6,470,759 B1 * | 10/2002 | Scott | ................. | 73/862.639 |
| 7,155,981 B2 * | 1/2007 | Matsuura et al. | ................. | 73/781 |
| 7,240,571 B2 * | 7/2007 | Walker | ................. | 73/862.627 |
| 7,444,879 B2 * | 11/2008 | Kurtz et al. | ................. | 73/777 |
| 7,520,175 B2 * | 4/2009 | Matsukawa et al. | ................. | 73/774 |
| 2003/0150276 A1 * | 8/2003 | Christensen et al. | ................. | 73/795 |

* cited by examiner

*Primary Examiner*—Max Noori
(74) *Attorney, Agent, or Firm*—Dilworth & Barrese LLP

(57) ABSTRACT

The present invention relates to a device for measuring mechanical quantities, in particular for detecting tensile forces, thrust forces and bending deformations, as well as to a method for measuring mechanical quantities and to the use of a device for measuring mechanical quantities.

23 Claims, 1 Drawing Sheet

DEVICE FOR MEASURING MECHANICAL QUANTITIES, METHOD FOR MEASURING MECHANICAL QUANTITIES AND USE OF A DEVICE FOR MEASURING MECHANICAL QUANTITIES

BACKGROUND OF THE INVENTION

The present invention relates to a device for measuring mechanical quantities with the features herein as well as a method for measuring mechanical quantities and the use of a device for measuring mechanical quantities.

It is known from the prior art to use separate devices for measuring mechanical quantities, in the art also referred to as force measurement lugs, in particular for measuring tensile forces. A substantially rectangular flat iron is provided with three recesses or bores, which have their center on the longitudinal axis of the device, wherein the longitudinal axis also is the axis of symmetry with respect to the arrangement of the bores of the devices.

Such devices are used for instance for measuring tensile forces in a range from 0 to 400 kN. The two outer bores are provided with bolts, via which the tensile forces are introduced into the measurement lug. The bolts are completely enclosed by the bore. In the third bore, strain gauges are disposed. The strain gauges provide for a force measurement in longitudinal direction, wherein substantially the linear expansion of the device is detected. Due to the compactness and fineness of the strain gauges, such force measurement lug is particularly susceptible. Moreover, manufacturing involves a high process risk due to the required tolerances and fits. It is also known as disadvantageous that due to the small change in length of this arrangement only very fine measurement signals can be tapped. Moreover, due to the influence of temperature and the bending influences, a plurality of measurement points are necessary in the lug, in order to compensate disturbing factors.

SUMMARY OF THE INVENTION

Therefore, it is the object of the present invention to provide a device by means of which mechanical quantities can be measured with less effort and at the same time with a much higher accuracy.

In accordance with the invention, this object is solved by a device for measuring mechanical quantities with the features herein. Accordingly, it is provided that the device for measuring mechanical quantities includes first recesses for receiving first means, wherein force can be introduced into the device by means of the at least two first means. There is provided at least one second means, by which mechanical quantities can be detected, and at least one second recess. The first recesses do not completely enclose the first means, and at least two opposed first recesses are connected with a second recess. The first recesses and the second recesses form one common recess. The recesses form a continuous opening, i.e. they completely extend through the material of the device.

The common recess provides the advantage that the linear expansion of the device is converted to a bending elongation. The same can be measured in transverse direction of the change in length of the device, from which the tensile force present is obtained. The conversion of the linear expansion to a bending elongation is made possible in that the first recesses do not completely enclose the first means and the enclosure of the second recess thus undergoes an almost unimpeded deflection as a result of the change in length. Since the change in length in transverse direction is greater than the change in length in longitudinal direction, measurement therefore can be made more easily and more accurately. Another consequence is that it is not absolutely necessary to use strain gauges as second means, but other measuring systems such as optical methods can also be used. Another advantage consists in that a plurality of measurement methods can be used at the same time, so that the acquisition of measurement data is effected redundantly. This can be advantageous in safety-relevant applications.

It can be provided that the first recesses are substantially circular. As a result, it is possible to use first means of circular cross-section in connection with the device. In this case, the first recesses can for instance be formed by a continuous bore which includes a gap towards the second recess, which connects the first recess with the second recess. This involves the advantage that for instance when applying a tensile force with the first means, the tensile force is not proportionally absorbed already by the enclosure of the first recess, but is introduced almost free of loss into the enclosure of the second recess.

Advantageously, the common recess formed by the first and second recesses has substantially rounded contours. As a result, stress peaks can be avoided and a uniform flux of force can be achieved in the device. The only corners of the contour merely are obtained at the gap which connects the first recess with the second recess. The remaining contours are rounded without exception, so that substantially rounded contours of the common recess formed by the first and second recesses are obtained.

The second means can be mounted adjacent to the second recess and/or be aligned with the same. On the enclosure of the second recess, for instance, the bending elongation as a result of the introduction of force can be measured particularly easily, so that mechanical quantities such as change in length, elongation or forces can easily be determined.

At least two second means can be provided, which are mounted on different planes or different side faces of the device. Hence, a higher measurement accuracy can be achieved.

The first means can be configured as bolts. As a result, it is possible to use the device of the invention for instance in conjunction with already existing measuring devices which include bolts.

It can be provided that the second means comprise an optical, electromagnetic or electrostatic measuring system. Such measurement methods operate very reliably and allow an inexpensive, fast and safe detection of mechanical quantities. By means of these measurement methods it also becomes possible to detect the distribution of forces or the stress distribution in its entirety and not, as previously, only at the corresponding measurement points. As a result, more accurate evaluations can be made.

In addition, it can be provided that the second means comprise strain gauges. It is conceivable to mount the strain gauges at the enclosure of the second recess of the device, where also the greatest bending elongation occurs. Strain gauges have the advantage that they provide electric signals which can easily be evaluated.

It can be provided that the device has an elliptical or substantially circular basic shape. Such shape provides for utilizing bending deformations for the measurement. At the same time, such shape allows to transmit great forces via the device. Elliptical basic shapes with the longer axis in the direction of force allow to present the larger deformations occurring under load in transverse direction. This provides for measuring the deformations in transverse direction. An essential advantage of such basic shape is the fact that the flux of force remains as undisturbed as possible.

In an advantageous aspect of the invention, the basic shape can have at least two axes of symmetry, wherein the first axis of symmetry extends through the centers of the first recesses and the second axis of symmetry maps at least two opposed first recesses onto each other. This provides for a uniform force distribution or abridged load distribution in the device.

One half of symmetry with a first recess and the part of a second recess can approximately have the shape of a torso with head. The first recess forms the head, the gap connecting the first recess with the second recess forms the neck, and the part of the second recess forms the torso. Such contour allows an optimum flux of force and a uniform stress distribution in the device. In particular, the occurrence of stress peaks thereby is prevented. In addition, disturbing influences as a result of the shape are reduced.

In an advantageous aspect, two opposed first recesses and one second recess can be provided. The two first recesses can lie on the axis of symmetry, wherein the axis of symmetry is congruent with the direction of force.

It is conceivable that two opposed webs are provided in the second recess. This involves the advantage that strain gauges can for instance be mounted on the webs. Furthermore, it is conceivable to detect the distance between the webs and thereby measure the bending deformations of the device.

The webs can be formed inversely T-shaped. The T-ends of the webs then protrude into the second recess. The opposed T-ends thus form a gap in the second recess.

In an advantageous aspect, the webs can lie on an axis of symmetry of the device. The symmetric design provides for an optimum flux of force and a uniform stress distribution.

It is conceivable that third means are provided for the time-based detection of the mechanical quantities. This provides the advantage that long-term load tests can be performed by means of the device.

By means of the device, tensile forces, thrust forces or elongation can be detectable in at least one direction in space.

Furthermore, this invention relates to a method for measuring mechanical quantities, wherein a mechanical quantity is determined by means of a device according to the description herein via the second means. Such method involves the advantages that mechanical quantities such as tensile forces can be detected with a reduced influence of disturbing quantities, generally more accurate, easier and with more favorable measuring systems. Moreover, it becomes possible to redundantly detect the mechanical quantity to be detected by using different detection systems.

It can be provided to detect tensile forces, thrust forces or elongation in at least one direction in space by means of the device in accordance with this method.

Furthermore, it is conceivable that in accordance with the method mechanical quantities are detected by the third means on a time base and are used for determining the stability of adjoining components and/or new materials.

This invention also relates to the use of a device for measuring mechanical quantities according to the description herein, wherein the mechanical load of components is detected by means of the device. It can be provided that by means of the device tensile forces, thrust forces or elongation are detected in at least one direction in space.

BRIEF DESCRIPTION OF THE DRAWINGS

Further details and advantages of the invention will be explained in detail with reference to an embodiment illustrated in the drawing, in which.

DESCRIPTION OF THE PREFERRED EMBODIMENTS

Figure 1:
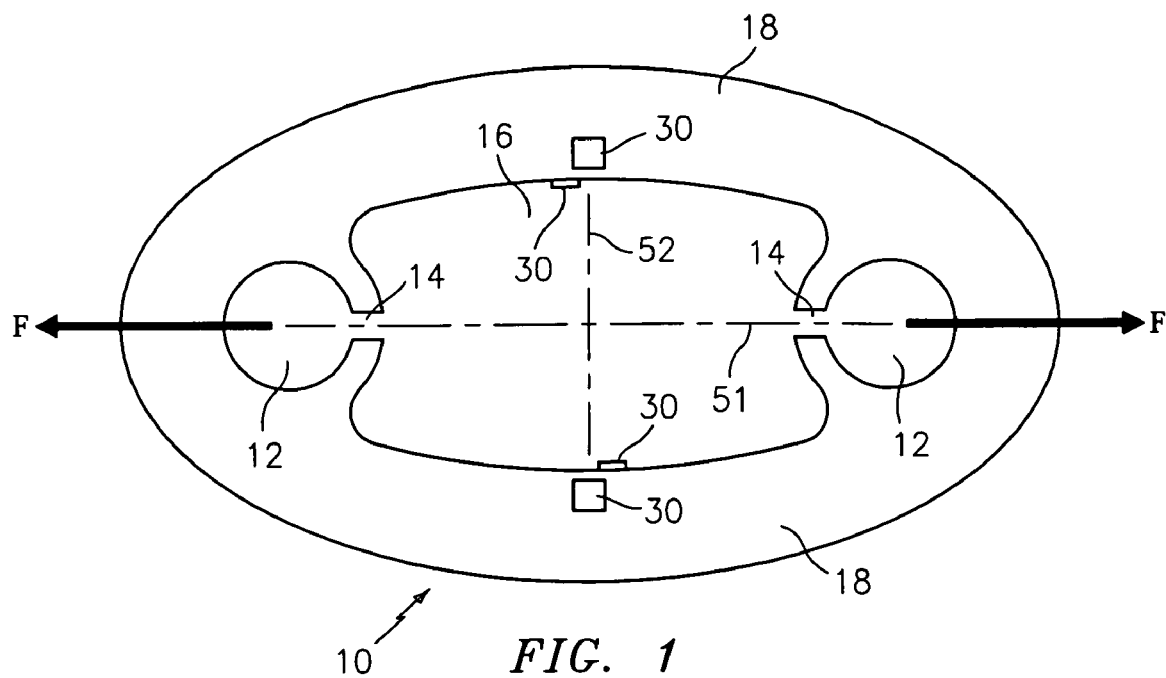
FIG. 1: shows a top view of the device for measuring mechanical quantities in a first embodiment.

FIG. 1 shows the device in accordance with the invention for measuring mechanical quantities in a first embodiment. The device 20 has an elliptical basic shape. The device 10 includes two opposed first recesses 12, whose centers are located on the axis of symmetry S1, which also is the force introduction axis of the forces F. The first recesses 12 are provided for receiving bolts (not shown) for introducing force, wherein the first recesses 12 do not completely enclose the bolts. The first recesses 12 are connected via the gap 14 towards the second recess 16. Via the gaps 14, the first recesses 12 thus form one common recess with the second recess 16.

The common recess formed by the first and second recesses 10, 12 has substantially rounded contours, and the only corners of the common recess are located at the gaps 14. In this embodiment, the basic shape of the device 10 has two axes of symmetry S1 and S2 vertical to each other, wherein the first axis of symmetry S1 extends through the centers of the first recesses 12 and the second axis of symmetry S2 maps the opposed first recesses 12 onto each other. The axis of symmetry S2 also is the direction of measurement.

The second axis of symmetry S2 divides the common recess in two halves, wherein one half approximately has the shape of a torso with head.

Figure 2:
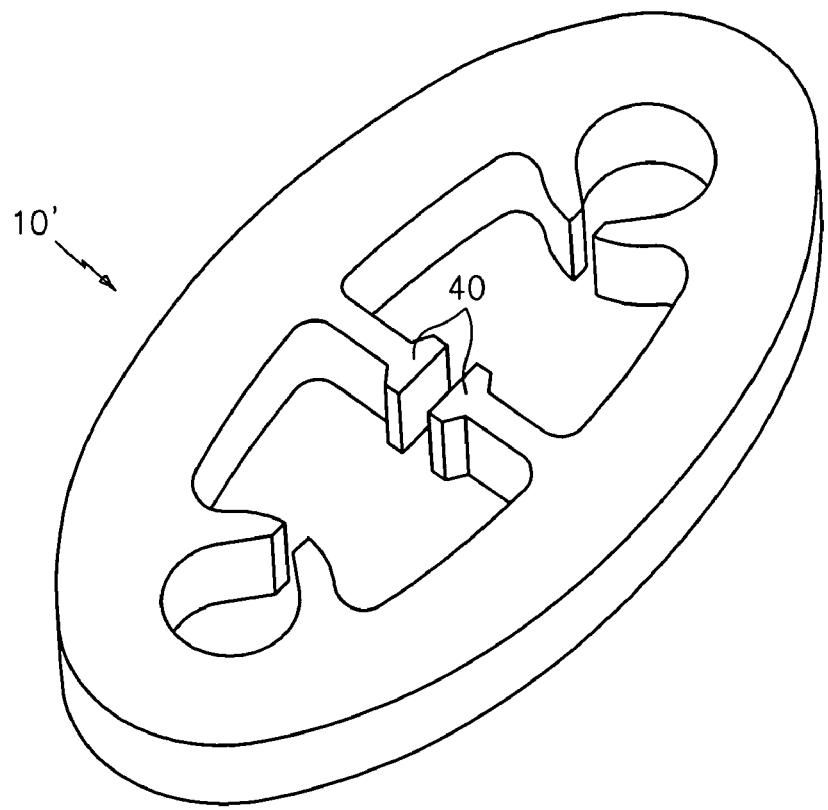
FIG. 2: shows a perspective view of the device for measuring mechanical quantities in a second embodiment.

On the device 10 a total of four strain gauges 30 are mounted, wherein two strain gauges each on the upper surface of the device are mounted at the enclosure 18 of the second recess 16 on the second axis of symmetry and two further strain gauges 30 are mounted on the side face of the inside of the second recess 16. Since the enclosure 18 of the second recess undergoes the greatest bending deformation, it is here that bending is detected and the measurement signal is tapped. Furthermore, it is provided to optically detect the bending deformations, and by means of the strain gauges and the optical measurement method (not shown) tensile force, elongation, stress distribution, thrust forces, torsion and material properties likewise are detected. FIG. 2 shows a device 10' in a further configuration. This device includes all features of the first embodiment, and in addition inversely T-shaped webs 40 are provided. At the inversely T-shaped webs 40, non-illustrated strain gauges 30 are mounted. In this embodiment, the device 10' is made of stainless steel.

The invention claimed is:

1. A device for measuring mechanical quantities comprising
   two first recesses (12) for receiving respective first means, by which, force is introducible into the device,
   at least one second recess (16) arranged to receive second means, by which mechanical quantities can be detected, and
   the first recesses (12) do not each completely enclose the respective first means received therein and said two first recesses (12) each communicate with said second recess (16) on axially opposite sides thereof through respective gaps (14) narrower than both said first (12) and second (16) recesses and together form one common recess.

2. The device for measuring mechanical quantities according to claim 1, wherein the first recesses are substantially circular.

3. The device for measuring mechanical quantities according to claim 1, wherein the common recess formed by the first and second recesses has substantially rounded contours.

4. The device for measuring mechanical quantities according to claim 1, wherein the second means are mounted adjacent to the second recess or aligned with the same.

5. The device for measuring mechanical quantities according to claim 1, wherein at least two second means are provided, which are mounted on different planes or different side faces of the device.

6. The device for measuring mechanical quantities according to claim 1, wherein the first means are bolts.

7. The device for measuring mechanical quantities according to claim 1, wherein the second means comprise an optical, electromagnetic or electrostatic measuring system.

8. The device for measuring mechanical quantities according to claim 1, wherein the second means comprise strain gauges.

9. The device for measuring mechanical quantities according to claim 1, wherein the device has an elliptical or substantially circular basic shape.

10. The device for measuring mechanical quantities according to claim 1, wherein the basic shape includes at least two axes of symmetry, the first axis of symmetry extends through the centers of the first recesses and the second axis of symmetry maps at least two opposed first recesses onto each other.

11. The device for measuring mechanical quantities according to claim 1, wherein one half of symmetry with a first recess and the part of a second recess approximately has the shape of a torso with head.

12. The device for measuring mechanical quantities according to claim 1, wherein two opposed first recesses and one second recess are provided.

13. The device for measuring mechanical quantities according to claim 1, wherein two opposed webs are provided in the second recess.

14. A device for measuring mechanical quantities comprising two first recesses for receiving respective first means by which force is introducible into the device,
   at least one second recess arranged to receive second means by which mechanical quantities can be detected, and
   the first recesses do not completely enclose the respective first means received therein and said two opposed first recesses are connected with said second recess and together form one common recess, wherein two opposed webs are provided in the second recess and the webs are formed inversely T-shaped.

15. A device for measuring mechanical quantities comprising two first recesses for receiving respective first means, by which force is introducible into the device,
   at least one second recess arranged to receive second means by which mechanical quantities can be detected, and
   the first recesses do not completely enclose the respective first means received therein and said two opposed first recesses are connected with said second recess and together form one common recess, wherein two opposed webs are provided in the second recess and the webs are located on an axis of symmetry of the device.

16. A device for measuring mechanical quantities comprising two first recesses for receiving respective first means, by which force is introducible into the device,
   at least one second recess arranged to receive second means by which mechanical quantities can be detected, and
   the first recesses do not completely enclose the respective first means received therein and said two opposed first recesses are connected with said second recess and together form one common recess, wherein third means are provided for a time-based detection of the mechanical quantities.

17. The device for measuring mechanical quantities according to claim 1, wherein by the device tensile forces, thrust forces or elongation can be detected in at least one direction in space.

18. A method for measuring mechanical quantities, wherein by a device according to claim 1, at least one mechanical quantity is determined via the second means.

19. The method for measuring mechanical quantities according to claim 18, wherein by the device tensile forces, thrust forces or elongation are detected in at least one direction in space.

20. A method for measuring mechanical quantities, wherein by a device comprising two first recesses for receiving respective first means, by which force is introducible into the device,
   at least one second recess arranged to receive second means by which mechanical quantities can be detected, and
   the first recesses do not completely enclose the respective first means received therein and said two opposed first recesses are connected with said second recess and together form one common recess, at least one mechanical quantity is determined via the second means and by third means, mechanical quantities are detected on a time base and are used for determining the stability of adjoining components or new materials.

21. Use of a device for measuring mechanical quantities according to claim 1, wherein the mechanical load of components is detected by the device.

22. Use of a device for measuring mechanical quantities according to claim 21, wherein tensile forces, thrust forces or elongation are detected by the device in at least one direction in space.

23. Use of a device for measuring mechanical quantities according to claim 21, the stability of adjoining components is determined by the device.

* * * * *